343-700 MS  AU 256  EX
3/14/78  XR  4,079,268

United States Patent [19]
Fletcher et al.

[11] 4,079,268
[45] Mar. 14, 1978

[54] THIN CONFORMAL ANTENNA ARRAY FOR MICROWAVE POWER CONVERSION

[76] Inventors: James C. Fletcher, Administrator of the National Aeronautics and Space Administration with respect to an invention of; Richard M. Dickinson, La Crescenta, Calif.

[21] Appl. No.: 730,045

[22] Filed: Oct. 6, 1976

[51] Int. Cl.² .......................... H01Q 1/38; H02M 1/00
[52] U.S. Cl. ..................................... 307/151; 361/395; 343/700 MS
[58] Field of Search .......... 343/700 MS, 708, DIG. 2, 343/846; 307/151; 361/395

[56] References Cited
U.S. PATENT DOCUMENTS

| | | | |
|---|---|---|---|
| 3,778,717 | 12/1973 | Okoshi et al. | 331/108 D |
| 3,887,925 | 6/1975 | Ranghelli et al. | 343/814 |
| 3,947,850 | 3/1976 | Kaloi | 343/846 |
| 3,987,455 | 10/1976 | Olyphant | 343/700 MS |

*Primary Examiner*—Eli Lieberman
*Attorney, Agent, or Firm*—Monte F. Mott; John R. Manning; Paul F. McCaul

[57] ABSTRACT

A structure of a circularly polarized, thin conformal, antenna array which may be mounted integrally with the skin of an aircraft employs microstrip elliptical elements and interconnecting feed lines spaced from a circuit ground plane by a thin dielectric layer. The feed lines are impedance matched to the elliptical antenna elements by selecting a proper feedpoint inside the periphery of the elliptical antenna elements. Diodes connected between the feed lines and the ground plane rectify the microwave power, and microstrip filters (low pass) connected in series with the feed lines provide DC current to a microstrip bus. Low impedance matching strips are included between the elliptical elements and the rectifying and filtering elements.

7 Claims, 6 Drawing Figures

THIN CONFORMAL ANTENNA ARRAY FOR MICROWAVE POWER CONVERSION

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to improvements in a microstrip circularly-polarized antenna array and more particularly to such an array for receiving and converting microwave power to DC current.

There is a long-standing need for low cost, low profile conformed antenna arrays which can be mass produced. That need has been more fully satisfied by microstrip antenna techniques than by any other prior art techniques reviewed in U.S. Pat. No. 3,803,623. According to that review of the technique, circular, elliptical, or even rectangular (but preferably elliptical) antenna elements are made by etching copper clad low-loss printed circuit board material, and a feedpoint is selected to match a low transmission line characteristic impedance, typically 50 ohms. A problem with laying out an array of antenna elements is providing the proper feedpoint for the desired input impedance in elements of a given geometry. It has been discovered that this problem is greatly alleviated by setting in the feedpoint sufficiently to reduce the input impedance to the value required for whatever feedpoint is selected.

When an array of dipole elements is employed to convert microwave energy for power, as for propulsion of a vehicle, it is desirable for the energy received to be rectified at the antenna array. Such an arrangement is commonly referred to as a "rectenna" because it combines the function of rectification with that of receiving microwave energy in the antenna array by placing rectifying diodes between dipole elements to break up the large aperture of the array into the smaller apertures of the dipoles as disclosed in U.S. Pat. No. 3,434,678 in which each dipole is effectively terminated by a diode whose DC output feeds into a common DC load either in series or in parallel with dipole elements. A problem with such a rectenna is that optimum performance of the dipoles requires a fixed orientation with respect to the polarization angle of the transmitted beam. Other examples of rectennas are to be found in U.S. Pat. Nos. 3,535,543 and 3,852,755. An example of how rectennas are to be used may be found in U.S. Pat. No. 3,114,517. It is desirable to combine with the technology of rectennas the technology of microstrip antennas of which U.S. Pat. Nos. 3,803,623 and 3,921,177 are exemplars, but in a thin conformal array particularly suited to mounting integrally with thin structures, such as aircraft wings, requiring minimal space.

SUMMARY OF THE INVENTION

In accordance with the invention, a plurality of circularly polarized (disk) antenna elements are fabricated on a metal sheet clading a layer of dielectric material by etching the metal sheet in a pattern which includes conductive strips connecting the elements to a common load terminal, each antenna element having at least one microstrip low-pass filter connected to low impedance matching stubs, and including at least one rectifying diode lodged in the dielectric material with one terminal connected to the conductive strip between the filter and low impedance matching stubs, and the other terminal connected to a metal backing sheet. For low power, all disk elements are connected in parallel to the load terminal with a single microstrip filter connected to matching stubs and a rectifying diode. For moderate power levels, disk elements are connected in series-parallel with a number of disk elements in series, each feeding into a microstrip filter and matching stubs with a diode connected between the microstrip filter and the matching stubs. For high power levels, disk elements of an array are connected in series-parallel, each with a plurality of filters matching stubs and rectifying diode assemblies. For impedance matching the feedpoint of a disk element to a microstrip filter, a feed line (conductive strip) is inset to a point of proper impedance within the periphery of the disk element by etching away a notch on the disk element on each side of the strip to the depth of the feedpoint selected. Each disk element is symmetrical about orthogonal major and minor axes, and preferably elliptical with a major axis not much greater than the minor axis. The feedpoint is selected to be between the major and minor axes for maximum efficiency of response to circularly polarized radiation incident upon the array; the precise impedance of the feedpoint is then selected to match the input impedance of the filter by insetting the connecting strip to a point inside the periphery of the array that is of proper impedance.

The novel features that are considered characteristic of this invention are set forth with particularity in the appended claims. This invention will best be understood from the following description when read in connection with the accompanying drawings.

DESCRIPTION OF PREFERRED EMBODIMENTS

Figure 1:
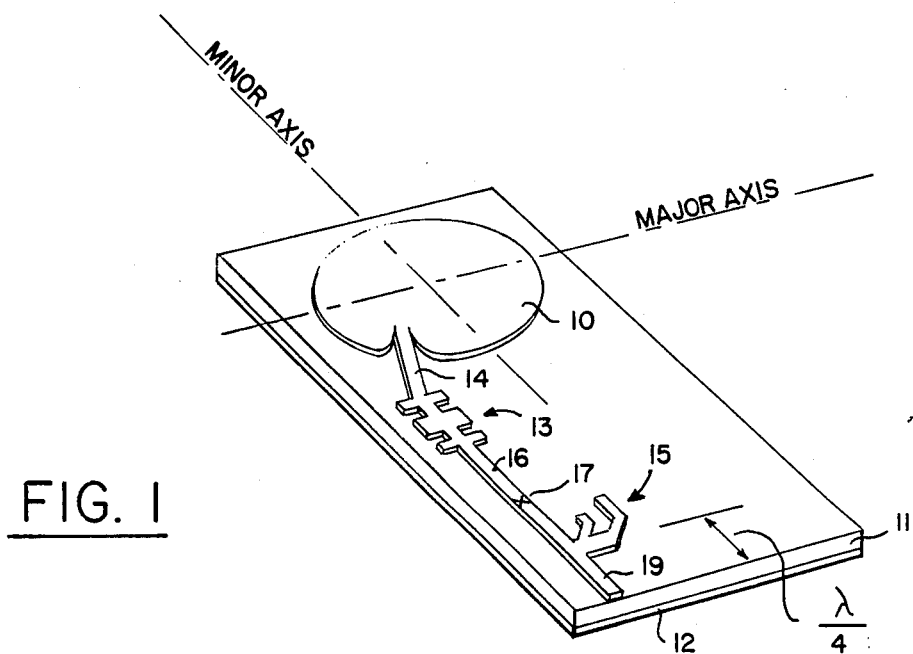
FIG. 1 is an isometric view of a single disk element having a strip line filter, a discrete diode rectifier and a stripline impedance matching stub assembly connected to a feedpoint within the periphery of the disk element.

Referring now to the drawings, FIG. 1 shows a circularly polarized microstrip antenna element 10 of copper foil on a layer 11 of dielectric material, such as teflon-impregnated fiberglass, backed by a sheet 12 of conductive material, such as copper or aluminum, which serves as a ground plane. A microstrip low-pass filter 13 is coupled to the antenna element by a microstrip feed line 14. Microstrip impedance matching stubs 15 are connected to the filter element by a microstrip conductor 16 in order to match the impedance of the filter to a low impedance load for the first and all even and odd harmonics of the frequency of the radiant energy being received. A diode $D_1$ is connected between the strip conductor 16 and the ground plane 12 at a point 17 of the strip conductor that is spaced a distance from the matching stubs and the low-pass filter to optimize coupling into the low impedance diode. The strip conductor 16 between the filter and the diode is selected to be of a width and length that will match the impedance of the diode.

Figure 2A:
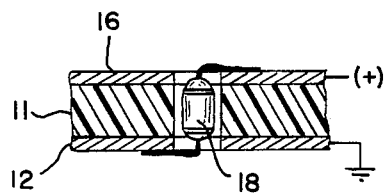
FIGS. 2a and 2b are sectional views of FIG. 1 along a line 2—2 showing two alternate ways in which a diode may be lodged in a dielectric layer and connected between a metal back plate and the microstrip circuit between a low-pass filter and a matching stub.
Figure 2B:
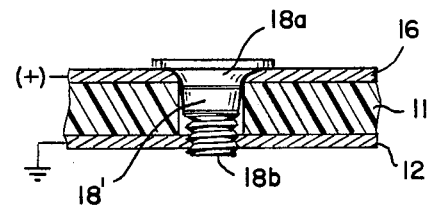

FIGS. 2a and 2b illustrate alternate ways in which a diode, is inserted through the dielectric layer 11 and connected between the conductive strip 16 and the ground plane 12. In FIG. 2a, the diode is encapsulated in dielectric material 18, such as glass or ceramic, so that inserting and connecting the diode is a simple matter of drilling a hole through the microstrip structure at the appropriate location, bending the diode leads and soldering or otherwise fusing the leads to the conductive strip 16 and the ground plane 12. In FIG. 2b, the diode is encapsulated in a ceramic body 18' between metal ends 18a and 18b. The end 18b is threaded to screw into tapping threads in the ground plane 12. In either case, the diode is inserted and connected with the polarity desired for the voltage to be derived from the microwave beamed power. For the polarity indicated in FIGS. 2a and 2b, the ground plane is the negative DC output terminal. The microstrip etched strip 16 of conductive material forms the positive DC output terminal. Since the sheet of conductive material from which the strip 16 is etched is everywhere at the same DC potential, it is possible to connect a lead anywhere, but it is preferable to connect the current collection lead in the form of a conductive strip 35 (FIG. 3) connecting to the quarter wavelength interconnecting line 19 of microwave power conversion units similar to the one unit shown in FIG. 1.

Included in the matching stubs 15 is an outer stub of a length selected to be $\lambda/4$ for the first harmonic, i.e., for the fundamental frequency of the received microwave power beam, and an inner stub of a length selected to be $\lambda/4$ for the second harmonic. The length of the conductive strip 19 from the matching stubs to the load (other antenna element or a power bus) is selected to be a quarter wavelength. In the case of connecting disk antenna elements in cascade, each with its own filter, rectifier and matching stubs, the length of the conductive strip 19 to the next antenna element 10 is selected to be $\lambda/4$.

The feed line 14 is connected to the antenna element 10 at a location midway between the major and minor axes such as to yield maximum response to circular polarized radiation. The impedance drops to a minimum as the connecting point is shifted toward the center of the disk (or the major axis as described in the aforesaid U.S. Pat. No. 3,803,623). Improved matching is achieved in accordance with one feature of this invention by setting in the feed element inside the periphery of the antenna element to a point where the impedance matches the characteristic impedance of the microstrip filter. For example, if the impedance of the antenna element is found to be 75 ohms on the periphery where the feed element is selected to be connected for laying out an array pattern, and the characteristic impedance of the microstrip filter is 50 ohms, the feed element is simply set in, as shown in FIG. 1, to a point where the impedance of the antenna element is found to be 50 ohms. The more the feed element is set in, the lower the impedance. This facilitates impedance matching without significantly affecting the efficiency of the antenna element.

Figure 3:
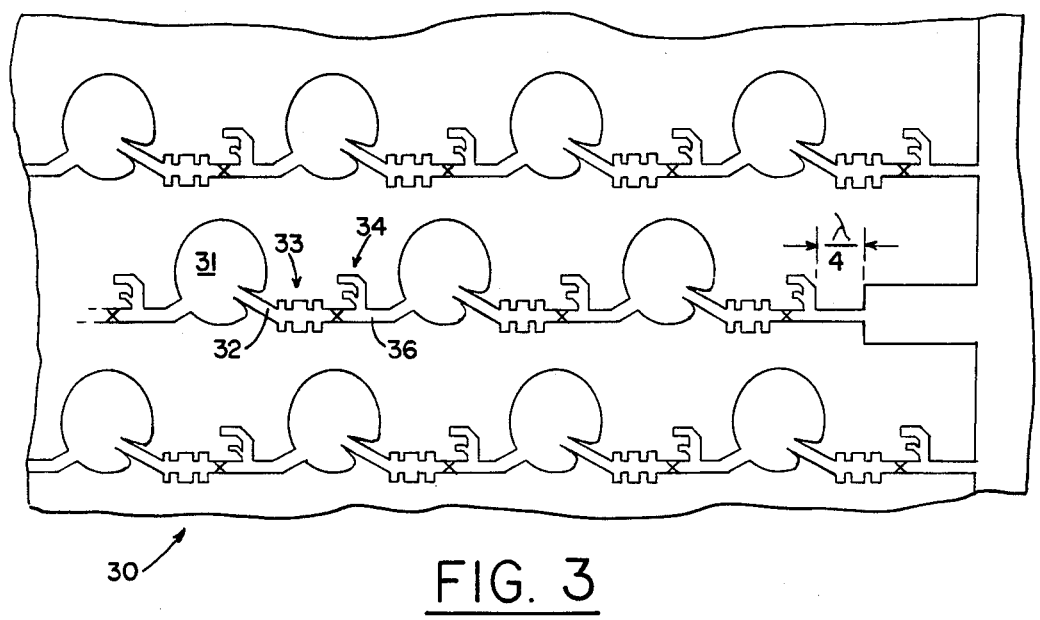
FIG. 3 is a plan view of a rectenna array for moderate power applications.
Figure 5:
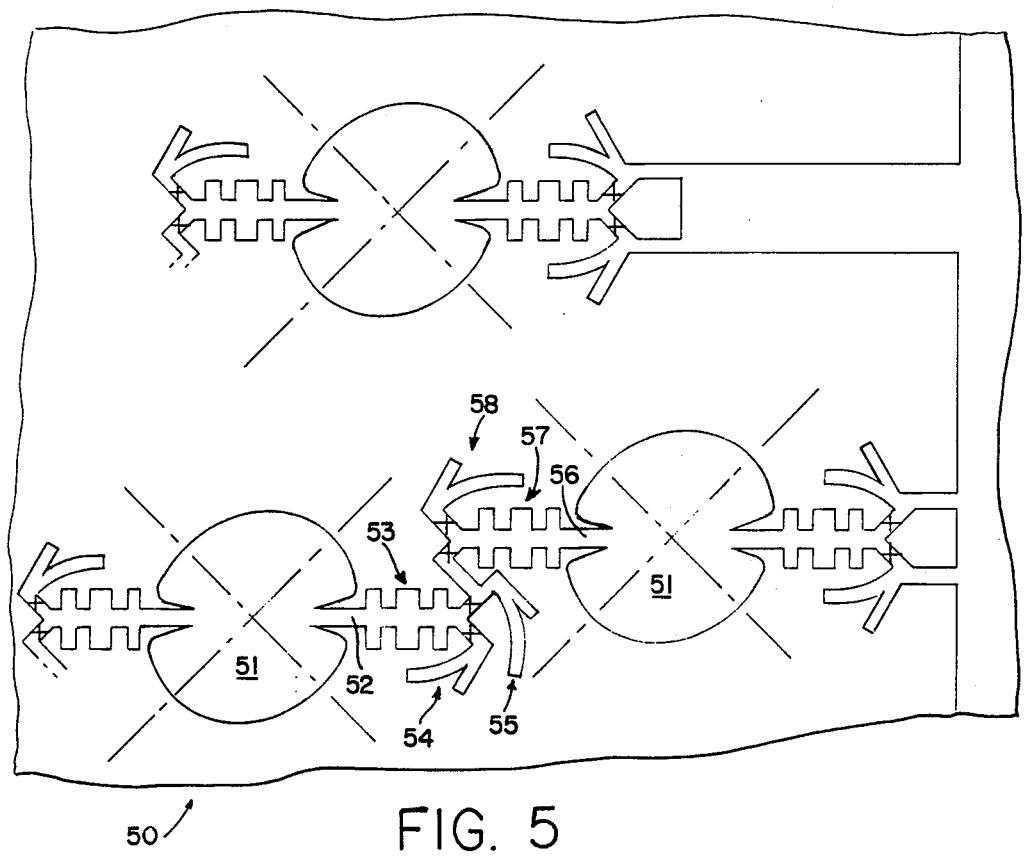
FIG. 5 is a plan view of a rectenna array for high power applications.
Figure 4:
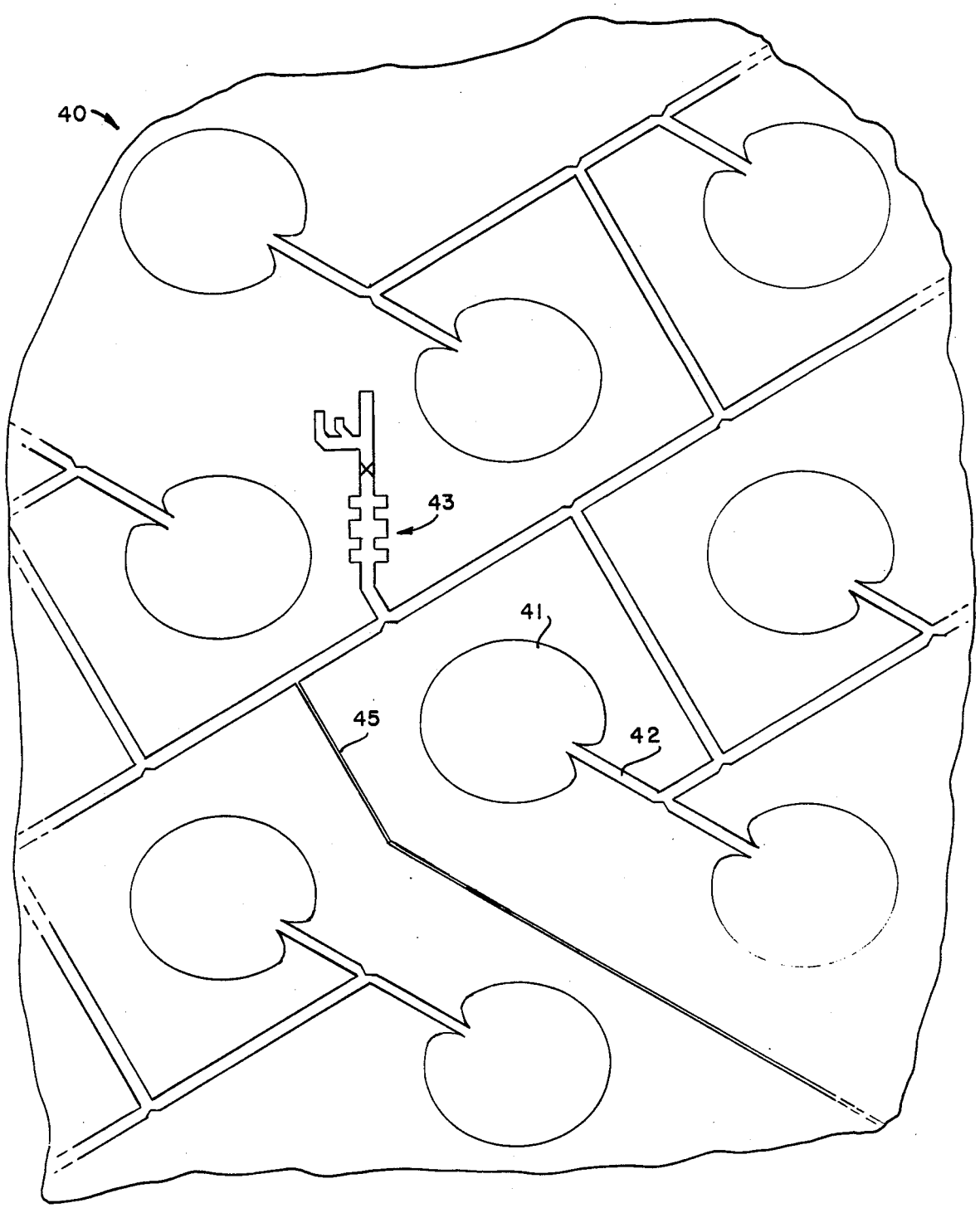
FIG. 4 is a plan view of a rectenna array for low power applications.

A rectenna assembly using microstrip technology and a circularly polarized (disk) antenna is useful for electrically powered vehicles, such as aircraft, because it virtually eliminates losses due to polarization angle misalignment. The microstrip implementation using an etched copper foil on a thin dielectric substrate provides sufficient flexibility to conform with vehicle structures such as aircraft wings or fuselage. However, for such applications as electrically powered vehicles, considerably greater power is required than can be received by one or two antenna elements. FIGS. 3, 4 and 5 illustrate arrays for moderate, low and high power applications, respectively. These large arrays can be conformed to the configuration of the metal surface of the aircraft. The ground plane can be mounted integrally with that metal surface, but in most cases would be an aluminum or copper sheet or foil backing on the dielectric connected electrically to the metal surface of the vehicle. An RF transparent coating can be applied over the microstrip antenna array for aerodynamic flow and protection of etched circuit elements.

Referring now to FIG. 3, which utilizes this novel combination of microstrip and rectenna technologies with circularly polarized antenna elements, a fragmentary section 30 of an array of rectenna units comprised of antenna disk elements 31, each having an inset feed line 32, a conductive strip filter 33, matching stubs 34 and a rectifying diode indicated by an "X", all as described with reference to FIG. 1. The rectenna units formed as shown and described in FIG. 1, are DC connected in cascade. A bus 35 along one edge of the array is used to connect all cascaded units in parallel.

The DC connection from one unit to the next in cascade is made by a conductive strip 36 of a length selected to be $\lambda/4$, as noted hereinbefore, which has as its function the provision of an RF isolated DC connection from the DC output of one unit to the disk element of the next. The conductive strip from the last unit connected to the bus bar 35 is likewise an RF isolated DC connection the length of which is selected to be a quarter wavelength long. The disk elements are spaced with their centers approximately $6/10\ \lambda$ apart in every direction, where $\lambda$ is measured in free space. The major axis of each disk element is selected to be approximately half a wavelength of the received RF energy as measured in the dielectric layer.

FIG. 4 illustrates a fragmentary section of a rectenna for low power applications in which the disk antenna elements 41 are spaced as before with their centers spaced approximately $6/10\ \lambda$ and with feed lines 42 set in as before. A microstrip conductive pattern shown connects the feed lines to a conductive strip filter 43. The output of the filter is coupled to matching stubs 44, and a diode indicated by an X rectifies the output of the diode as in the single element rectenna of FIG. 1. The feed lines 42 are set in as necessary for RF impedance matching with the input of the filter. The DC at the output of the filter is connected to a load through a thin, high impedance conductive strip 45 at any convenient point in the microstrip pattern, such as the geometric center of the pattern. All points of the microstrip pattern are at the same DC potential with respect to the ground plane, so the main concern other than RF impedance matching, in connecting together all of the feed elements 42 at the input of the filter, and in connecting the rectified and filtered output to a load, is the resistance of the microstrip lines to the total DC current received. That total will be limited for low power applications by the capacity of the single rectifying diode, which may range up to 50 watts.

For high power applications, a rectenna constructed in accordance with the present invention would be as shown for a fragmentary section 50 of an array shown in FIG. 5. Antenna elements 51 are arranged as before. A feed line 52 is inset as before and connected to a microstrip filter 53. The output conductive strip of the filter is bifurcated, and the branches are connected to matching stubs 54 and 55. In each branch there is a rectifying diode indicated by an X. The rectified and filtered DC output of one rectenna unit is DC connected to a second feed line 56 inset as the first feed line 52, and connected to a second conductive strip filter 57. The output of the second conductive strip filter 57 is connected to a bifurcated conductive strip, each branch having a rectifying diode. It should be noted that one branch shares the matching stubs 55 while the other has its own matching stubs 58. The result is a symmetrical arrangement of two feed lines connected to separate filters with two rectifying diodes at the output of each filter for a total of four rectifying diodes per disk element. The power capacity is thus four times that of the moderate-power arrangement of FIG. 3.

Limitations on the high flux density that may be received by the arrangement of FIG. 5 also include thermal dissipation as well as breakdown of the diodes, while the limitation on the low flux density by the arrangement of FIG. 4 is the directivity of the angular region within which RF energy is received due to any increase in the number of antenna disk elements arrayed. In other words, for the low flux density variant of FIG. 4, more elements would be desired, but the greater directivity that results limits the use of that variant because the array must then be pointed more accurately toward the low flux RF source in order to receive maximum power. Therefore it would be desirable to collect the incident RF power at a number of separate rectenna arrays of FIG. 4, each with a reasonably small nunmber of disk elements, and to sum the outputs of the separate rectenna arrays. Thus, for low power a number of disk elements may be arrayed and summcd via proper RF lines of proper lengths and characteristic impedances before presenting the summed RF energy to a conductive strip filter and diode. This allows the diode to operate at its most efficient conversion level of RF into DC output power. For the other extreme of high flux density, the arrangement whereby multiple diodes are fed RF power from a single antenna element allows the high level RF power to be divided among several diodes thereby preventing excess RF input to an individual diode thus promoting long life and high conversion efficiency of high power RF to high power level DC output. By paralleling diodes or subdividing the RF output of the antenna disk element before applying it to a rectenna converter circuit, the flexible microstrip array can efficiently operate at high level incident RF flux densities. An operating limit due to waste heat temperature rise in the microstrip ground plane obviously exists, therefore maximum RF flux density limits do exist which depend upon the conversion efficiency and array cooling.

Although particular embodiments of the invention have been described and illustrated herein, it is recognized that other embodiments may readily occur to those skilled in the art as modifications of those illustrated, or equivalent to those illustrated. For example, in the high-power arrangement of FIG. 5, the number of diodes connected in parallel to an antenna disk element is only limited by the skill with which the microstrip layout may be arranged to add other feed lines, filters, diodes and matching stubs without individual rectifying and filtering circuits touching, or coming into too close proximity. Thus as many as two, four, six, or even eight diodes per disk element are possible although only four diodes per disk element are shown in FIG. 5. Consequently, it is intended that the claims be interpreted to cover such modifications and equivalents.

What is claimed is:

1. An antenna array for microwave power conversion comprising a metal sheet cladding a layer of dielectric material, said layer of dielectric material being disposed over a metal backing sheet, and a plurality of circularly polarized antenna elements fabricated on said metal cladding sheet by etching said metal cladding sheet in a pattern which includes conductive strips connecting said antenna elements to a common load terminal and between said antenna elements and said load terminal, at least one microstrip low-pass filter connected to low impedance matching stubs and lodging a rectifying diode in said dielectric material with one terminal connected between said filter and matching stubs, and the other terminal connected to said metal backing sheet.

2. An antenna array for microwave power conversion as defined in claim 1 wherein each conductive strip connected to an antenna element as a feed line to a filter is inset to a point inside the periphery of the antenna element of proper impedance to match the impedance of the filter.

3. An antenna array as defined in claim 2 for low microwave power conversion wherein all antenna elements are connected in parallel to said load through a single microstrip low-pass filter connected to matching stubs, and a single rectifying diode lodged in said dielectric material with one terminal connected to said conductive strip between said filter and said low impedance matching stubs, and the other terminal connected to a metal backing sheet.

4. An antenna array as defined in claim 2 wherein all of said antenna elements are connected in series-parallel with a plurality of groups of said antenna elements connected in cascade with each feeding into a separate microstrip filter connected to separate matching stubs, and with a separate diode connected between the microstrip filter and the matching stubs, and wherein the last of each group of antenna elements so cascaded is connected to a common load through a last microstrip filter connected to matching stubs, and with a separate diode connected between said last microstrip filter and connected matching stubs.

5. An antenna array as defined in claim 4 for high power conversion wherein each of said antenna elements is connected to a plurality of microstrip filters, matching stubs and rectifying diodes.

6. An antenna array for microwave power conversion comprising a plurality of circularly polarized antenna elements fabricated on a metal front sheet cladding a layer of dielectric material over a metal backing sheet by etching said metal front sheet in a pattern which includes conductive strips connecting the said antenna elements to a common load terminal, each antenna element having at least one microstrip low-pass filter connected to low impedance matching stubs, and at least one rectifying diode lodged in said dielectric material with one terminal connected to said conductive strip between said filter and low impedance matching stubs, and the other terminal connected to said metal backing sheet, each conductive strip feeding from an antenna element into a filter being inset within the periphery of the antenna element to a point of proper impedance to match the input impedance of the filter.

7. An antenna array as defined in claim 6 wherein each antenna element is symmetrical about orthogonal major and minor axes, and the place for the connecting conductive strip is selected to be between the major and minor axes for maximum response to circularly polarized radiation incident upon the array and the precise impedance of the selected feedpoint is then selected to match the input impedance of the filter by insetting the connecting strip to a point inside the periphery of the array to a point that is of proper impedance.

* * * * *